United States Patent
Li et al.

(10) Patent No.: US 12,362,918 B2
(45) Date of Patent: Jul. 15, 2025

(54) HARDENED KEY DERIVATION IN MULTI-PARTY COMPUTATION

(71) Applicant: MetaLoop Inc., Fremont, CA (US)

(72) Inventors: Xiangjun Li, Sunnyvale, CA (US); Yijie Bei, San Jose, CA (US); Ryan Lehmkuhl, Oakland, CA (US)

(73) Assignee: MetaLoop Inc., Fremont, CA (US)

( * ) Notice: Subject to any disclaimer, the term of this patent is extended or adjusted under 35 U.S.C. 154(b) by 0 days.

(21) Appl. No.: 18/352,914

(22) Filed: Jul. 14, 2023

(65) Prior Publication Data

US 2024/0259191 A1 Aug. 1, 2024

Related U.S. Application Data (60) Provisional application No. 63/482,017, filed on Jan. 27, 2023.

(51) Int. Cl.
*H04L 9/08* (2006.01)

(52) U.S. Cl.
CPC .......... *H04L 9/0825* (2013.01); *H04L 9/0869* (2013.01)

(58) Field of Classification Search
None
See application file for complete search history.

(56) References Cited

U.S. PATENT DOCUMENTS

| | | | |
|---|---|---|---|
| 11,283,595 B1* | 3/2022 | Liao | G06F 16/172 |
| 2007/0009103 A1* | 1/2007 | Zhu | H04L 9/0841 |
| | | | 380/270 |
| 2021/0204114 A1* | 7/2021 | Mo | H04W 12/041 |
| 2022/0045867 A1* | 2/2022 | Beery | H04L 9/0891 |
| 2022/0398339 A1* | 12/2022 | Marson | G06F 12/1408 |
| 2023/0224147 A1* | 7/2023 | Pettit | H04L 9/3239 |
| | | | 380/44 |

FOREIGN PATENT DOCUMENTS

TW 202236822 A * 9/2022

* cited by examiner

*Primary Examiner* — Bassam A Noaman
(74) *Attorney, Agent, or Firm* — Kwan & Olynick LLP (57) ABSTRACT

Systems and methods for hardened key derivation in multi-party computation. The method includes deriving child private key shares from parent private key shares using hardened multiparty computation while maintaining key refresh properties. The method includes selecting a random number generator G and a second random number generator G'. Child private key shares are derived by computing an offset using G'.

14 Claims, 7 Drawing Sheets

HARDENED KEY DERIVATION IN MULTI-PARTY COMPUTATION

CROSS-REFERENCE TO RELATED APPLICATIONS

This application claims the benefit of prior application U.S. Provisional Application No. 63/482,017, filed Jan. 27, 2023, titled "HARDENED KEY DERIVATION IN MULTI-PARTY COMPUTATION" by XiangJun Li et al., which is herein incorporated by reference in its entirety for all purposes.

TECHNICAL FIELD

The present disclosure relates generally to computer systems, and more specifically to cryptography.

DESCRIPTION OF RELATED ART

Elliptic-curve-based public key cryptography has found wide applications where security is critical. Like other asymmetric cryptography solutions, elliptic curve cryptography (ECC) provides ways to tackle fundamental tasks such as message encryption/decryption and message source verification. However, to augment the use cases of ECC algorithms, it is useful to generate one or more descendent public-private key pairs given a parent public-private key pair. For example, in a hierarchical organization, a manager can hold a parent public-private key pair and use it to generate descendent key pairs that get disseminated to his/her subordinates. The subordinates can then be able to sign/encrypt some documents individually using their keys, whereas the manager always has the ability to claim ownership of the signature or decrypt the documents using his/her parent public-private key pair simply because the manager can derive the descendent key pairs the same way once again.

There are two types of derivation: non-hardened and hardened. Non-hardened derivation refers to derivation that allows reverse engineering of a parent key from a child private key and public key. Hardened derivation refers to derivation that does not allow reverse engineering of the parent key given the child private key and public key. Hardened derivation is more secure. However, hardened derivation in multiparty computation is not practical using current methods because there is currently no method to implement hardened derivation in a multi-party computational setting while still maintaining certain important properties, such as key refresh. Thus, there is a need for a way to perform hardened derivation in a multi-party computational setting.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure relates to a method. The method comprises providing a plurality of parent private key shares to one or more parties. The plurality of private key shares together form a single whole private key if combined. The method also includes designating a first random generator G for generating a public key and selecting a second random generator G'. Last, the method includes deriving a plurality of child private key shares using multiparty computation derivation and G'. The multiparty computation derivation behaves like a hardened derivation while still maintaining key refresh properties.

In some embodiments, key refresh properties are maintained if the sum of a plurality of original private key shares equals the sum of a plurality of refreshed private key shares. In some embodiments, selecting G' includes selecting an elliptic curve generator with the following property: $G'(x\_1) *G'(x\_2) \ldots *G'(x\_n)=G'(y\_1)*G'(y\_2) \ldots *G'(y\_n)$ whenever $(x\_1+x\_2 \ldots +x\_n)=(y\_1+y\_2 \ldots +y\_n)$, where * is some operator, $x\_n$ is an original private key share, and $y\_n$ is a refreshed private key share. In some embodiments, a child private key share is derived by adding an offset to a parent private key share, the offset being defined by: offset=hash((sum of all parent private key shares)*G', path), where path is a scalar value for child key share derivation. In some embodiments, deriving the plurality of child private key shares includes each party of the one or more parties providing the product of their respective parent private key share and G' to all other parties in the one or more parties. In some embodiments, deriving the plurality of child private key shares includes each party of the one or more parties generating an offset. In some embodiments, each party can compute a new public key without ever receiving another party's child private key share.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, portions of the techniques of the present disclosure will be described in the context of elliptic curve cryptography. However, it should be noted that the techniques of the present disclosure apply to a wide variety of different computer systems, including cryptographic systems. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of connections, such as a bus, may reside between the processor and memory. Consequently, a connection does not necessarily mean a direct, unimpeded connection unless otherwise noted.

As mentioned above, the irreversible derivation of addresses in a multiparty computation (MPC) setting of digital asset custody is not currently available using today's technology. In the non-MPC context, there is hardened derivation and non-hardened derivation. With hardened derivation, one cannot reverse engineer the parent key even if one has the child private key and the parent chain code (public key). A common example of hardened derivation is derivation of a child key using a hash function. The hash function is a one-way function-one cannot derive the parent from the child. In the MPC setting, the use of hash functions on multiple parent shares to generate child keys may seem like a straightforward approach to implementing hardened derivation. However, this method undermines the key refresh property, as previously mentioned. This is because the sum of the hashed values does not match the hashed value of the sum. Thus, current MPC derivation settings are non-hardened. With non-hardened derivation, key derivation is reversible-meaning if one has a child key and the public key, one can get back to the parent key. Even though the structure is hierarchical, all the keys are descendants of a root key. In a non-hardened setting, derivation can be done by taking the hash of the public key, but not the private key. Since the public key is known to the public, one can theoretically reverse the process by simply subtracting the hash of the parent public key from the child private key. This is not ideal for security reasons.

In single party setting, the one party controls the private key. This means the party can do a one-way function, such as hashing, on the private key to ensure hardened derivation. If a third party is able to view or have access to the child private key, the third party will still not be able to derive the parent private key. In the MPC setting, each party only controls a share of the private key. Since systems need to maintain the property of key refresh, a one-way function, such as a hash function, cannot be used.

According to various embodiments, the techniques and mechanisms of the present disclosure provide for a solution to essentially operate as a "hardened" derivation in an MPC setting, while retaining key refresh. Details of the solution are presented below.

Figure 1:
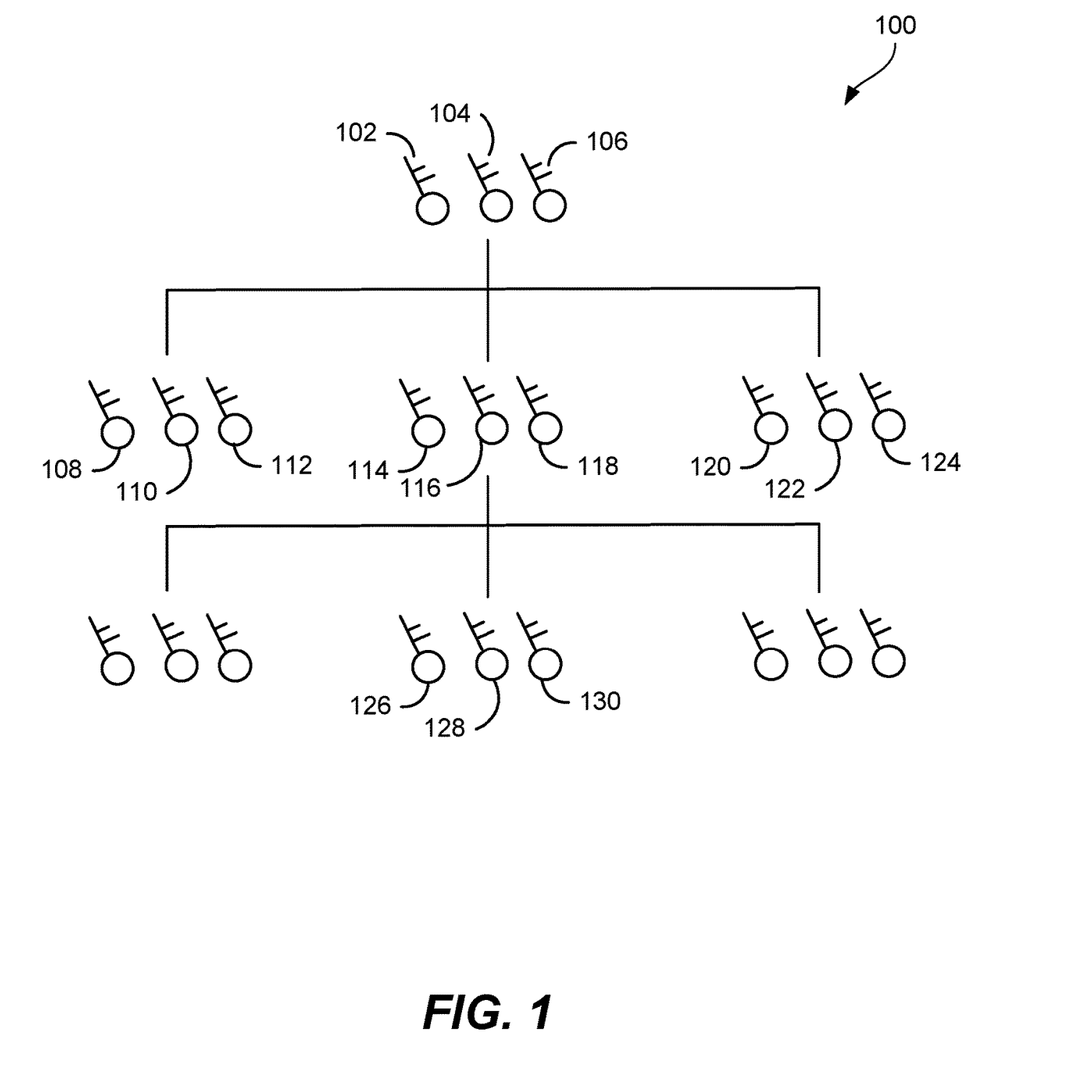
FIG. 1 shows an example of key derivation in multi-party computation, in accordance with embodiments of the present disclosure.

FIG. 1 shows an example of key derivation in multi-party computation, in accordance with embodiments of the present disclosure. Normally, in a non-MPC setting, a private key may be just a single random very large number. For example, a private key X may be defined as X=4567898765678765456787654567876567898765445678. In a MPC setting, such as MPC system 100, X may be distributed as three separate key shares 102 (with a value of x_1), 104 (with a value of x_2), and 106 (with a value of x_3), where X=x_1+x_2+x_3. These three keys can be combined to form a single whole private key X. In some embodiments, X is never explicitly stored anywhere because each party P1, P2, and P3 that owns private key shares 102, 104, and 106, respectively, never shares their respective private key share with any of the other parties. In fact, in some embodiments, each party only shares the value x_i*G to each of the other parties, where x_i represents each party's respective private key share, * represents some operation (not necessarily multiplication), and G is a predefined chosen elliptic curve generator used to generate public keys from private keys. Thus, in such embodiments, each party only shares their respective public key share to others. In some embodiments, public key shares can be generated by calling a function get_pub_key(x_i).

In some embodiments, private keys can also be used to sign messages to ensure receiving parties that the sender is indeed the correct sender. In such embodiments, the signature can be achieved by calling a function sign(x, m), where x represents the private key, m represents the message, and sign ( ) is an irreversible function. For example, a signature s can be derived from s=x multiplied by msg. According to various embodiments, this equation has no division. In other words, even with the message m and the signature s, one cannot derive private key x by dividing s by m. This property is what makes digital signatures secure. The only thing private is x. In an MPC setting, the signature can be obtained by combining signature shares: sign(x_1, m)+sign(x_2, m)+sign(x_3, m), where + represents some operation that is not necessarily scalar addition.

In some embodiments, public keys can also be used for receiving cryptocurrency tokens, such as Bitcoin. In some embodiments, a digital wallet can be a public key address where digital tokens can be sent. Thus, in an MPC setting, an address or digital wallet can only be generated after public key shares are combined to a form a whole public key.

Because of various application needs, people may want to generate more addresses for various uses. However, issuing new keys randomly would require more storage space and would unnecessarily complicate key management. Therefore, generating new addresses without the need to store the additional addresses (e.g., being able to compute the additional addresses on-the-fly or dynamically). Thus, private key derivation is useful for generating more private keys, which are used to generate more addresses, without needing to store the child keys.

FIG. 1 illustrates an example of key share derivation. At the beginning, customers generate three root or parent key shares, 102, 104, and 106. Since these key shares are the first, each party that receives a parent key share must store the key share in a secure location. In some embodiments, the parties can be humans or part of a electronic system, such as a server or a program. In some embodiments, one key share can be stored by an actual user and the other two key shares are stored by the platform. Although FIG. 1 shows three key shares, systems can use any number of key shares as long as the same properties are maintained.

According to various embodiments, if users want to derive more key shares for more accounts, the system undergoes a process called key derivation. As mentioned above, because the system only wants to store just the three root key shares, the system must derive and keep track of the derivation methodology, using a "path." In simple terms, a path is a value used to determine a child private key from a parent. For example, child private keys can be generated using a function called derive($x\_i$, path), where path is a scalar. In other words, key derivation can be a function of the parent key and the path. The same applies for key shares. In the example given in FIG. 1, parent key shares 102, 104, and 106 can be used to derive children key shares 108, 110, and 112 using a single path, e.g. path=1. In addition, the parent key shares can also derive children key shares 114, 116, and 118 using a different path, e.g., path=2. Last, FIG. 1 shows children key shares 120, 122, and 124 being derived using a third path, e.g., path=3. In some embodiments, each triplet of child key shares can also be used as local "root" key shares to derive other child key shares. For example, the child key share triplet comprising key shares 114, 116, and 118 can be used to derive a plurality of other second order child key share triplets, one of which includes second order child key shares 126, 128, and 130.

In a simple example, a child can be derived by simply adding the path. Thus, if the path is 1, then child private key share 108 has the value of $x\_1+1$, key share 110 has the value of $x\_2+1$, and key share 112 has the value $x\_3+1$. In the same simple example, the new whole child key (based on child key shares 108, 110, and 112) would have the value of original whole parent key X+3 (because each child key share was incremented by 1).

The simple examples provided with respect to FIG. 1 serve to illustrate how child key shares can be derived generally. However, in order to derive the child key shares in a hardened manner, a key refresh property must be preserved. For example, a public message M signed by parent key shares 102, 104, and 106 would have the signature S=MPC_HARDENED_SIGN(M, $x\_1, x\_2, x\_3$). A signature using child key shares 108, 110, and 112 would be S=MPC_HARDENED_SIGN(M, $x\_4, x\_5, x\_6$), assuming key share 108 has the value of $x\_4$, key share 110 has the value of $x\_5$, and key share 112 has the value of $x\_6$. Maintaining key refresh properties requires that the sum of the original key shares is the same as the sum of the new refreshed key shares. If the sum changes, the private key changes and transaction cannot be signed. In some embodiments, private key x does not really exist in concrete form because there are many combinations of numbers that can lead to the sum. In some embodiments, since there are many combinations of x1, x2, x3 whose sum is x, if one key share is compromised, the key share can be refreshed. Of course, all other parties get a new variant as well, which is fine as long as the sum remains the same. As mentioned above, this cannot be done with a simple hash function.

The following example explains one possible implementation of the problem with using traditional one way functions like a simple hash function. If ($x\_1, x\_2, x\_3$) are parent private key shares, then ($x\_4, x\_5, x\_6$) represents derived child private key shares. If X is the whole parent private key, then $X=x\_1+x\_2+x\_3$. If a function G is a hash function, then $G*x\_1=Hash(x\_1)$, $G*x\_2=Hash(x\_2)$, and $G*x\_3=Hash(x\_3)$. The problem here is that key refresh would require $Hash(x\_1)+Hash(x\_2)+Hash(x\_3)=Hash(x\_4)+Hash(x\_5)+Hash(x\_6)$, which is not true if a simple hash function is applied. The reason for key derivation is to remember the root values. If key refresh is not maintained, one would have to store $x\_4, x\_5$, and $x\_6$ when getting the new keys, along with any other child key derivative. With key refresh, the goal is to store just $x\_1, x\_2$, and $x\_3$ separately while everything else can be recovered. Thus, with key refresh, a function F must be chosen such that $F(x\_1)+F(x\_2)+F(x\_3)=F(x\_4)+F(x\_5)+F(x\_6)$. F being a simple Hash would not qualify. Therefore, hardened MPC derivation requires implementing a more complicated methodology.

FIGS. 2A-2C and 3 illustrate an example implementation of a solution to this problem. According to various embodiments, the key is to find a function that maintains the equality using elliptical curve cryptography. In elliptical curve cryptography, there are private key and public key pairs. The public key is denoted by P. Public key points are points on an elliptical curve and can be shown on a cartesian plane, having (x, y) coordinates, where x is the private key and y is the public key.

According to various embodiments, P can be the product of multiplying a private key with a point G, or P=x*G. In such embodiments, x is the private key and G is a random number generator. By multiplying different values of x to G, one is able to generate a self-contained set of points. Because G is a random generator, it generates different Ps. In some embodiments, G is selected by a known protocol, e.g., SCEP256K1.

According to various embodiments, a concept similar to generating a private/public key pair can be used to derive child key derivatives as well. However, the function chosen must maintain the following property $(x\_1+x\_2 \ldots x\_n)=(y\_1+y\_2 \ldots y\_n)$, while maintaining "onewayness." One last important feature is to keep the result of the function a secret. In other words, make the result of $F(x\_n)=y\_n$ a secret. With standard private/public key pair security, the result can be made public because the function is one way. However, with the solution presented herein, the result of the derivation is never provided to the public. This can be achieved by finding any function $F(x)=y$ that maintains the following property: $F(x\_1)*F(x\_2)*F(x\_3)=F(y\_1)*F(y\_2)*F(y\_3)$, if $x\_1+x\_2+x\_3=y\_1+y\_2+y\_3$, where F is a one-way function and * is any operator. In other words, F has to follow the distributive law in an elliptical curve.

According to various embodiments, a child key share $y\_i$ can be calculated using $y\_i=x\_i+Offset$, where Offset=hash$((x\_1+x\_2 \ldots x\_n)*F, path)$, F is a function that follows the distributive law in an elliptical curve (as mentioned above), and path is a scalar. In some embodiments, one choice for F can be G', a random number generator that is different from G, but with the same properties as G. In other words, as long as $x\_i*G'$ is shared with other parties, instead of $x\_i$, then the offset is actually calculated using the hash of the sum of all the root key shares*G', making each party able to calculate their respective $y\_i$ without ever knowing another party's respective $x\_i$. In other words, in some embodiments, each party derives a child key share via the following $y\_1=x\_1+$hash$((x\_1+x\_2 \ldots x\_n)*G', path)$. It is important to note that G cannot be used because if G is used instead of G', the derivation becomes nonhardened.

Figure 2A:
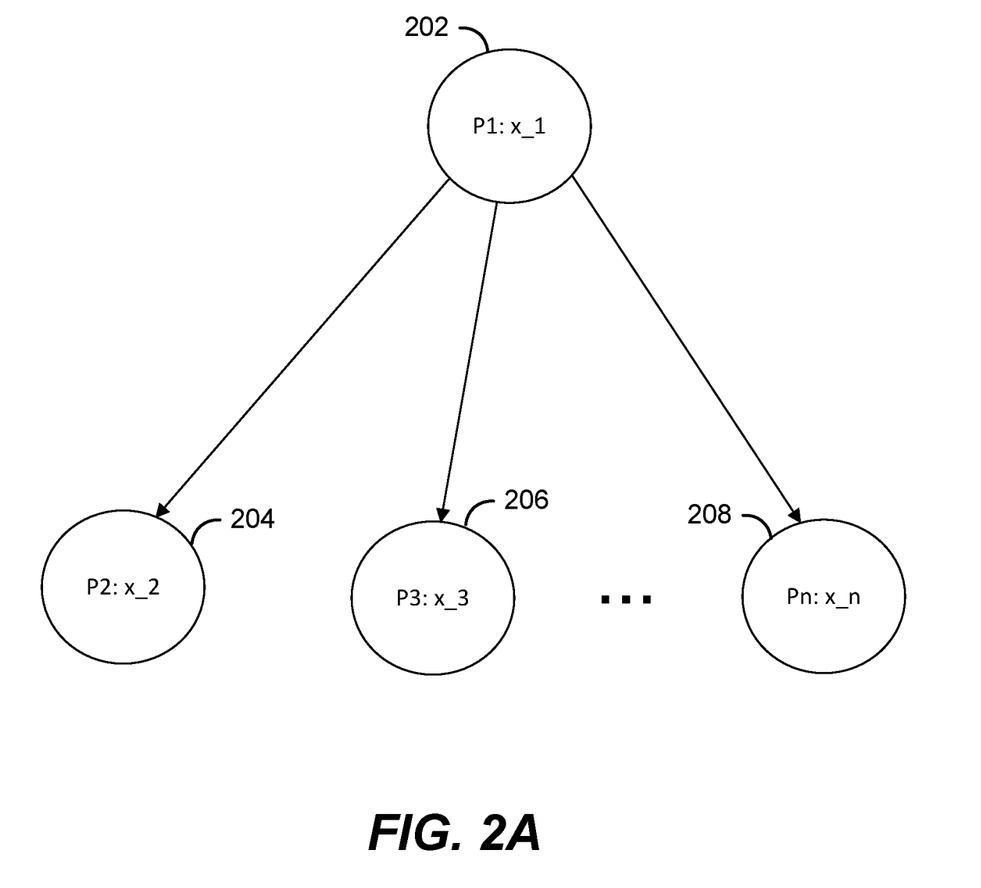
FIGS. 2A-2C illustrate one example of information is shared among parties in multi-party computation, in accordance with embodiments of the present disclosure.
Figure 2B:
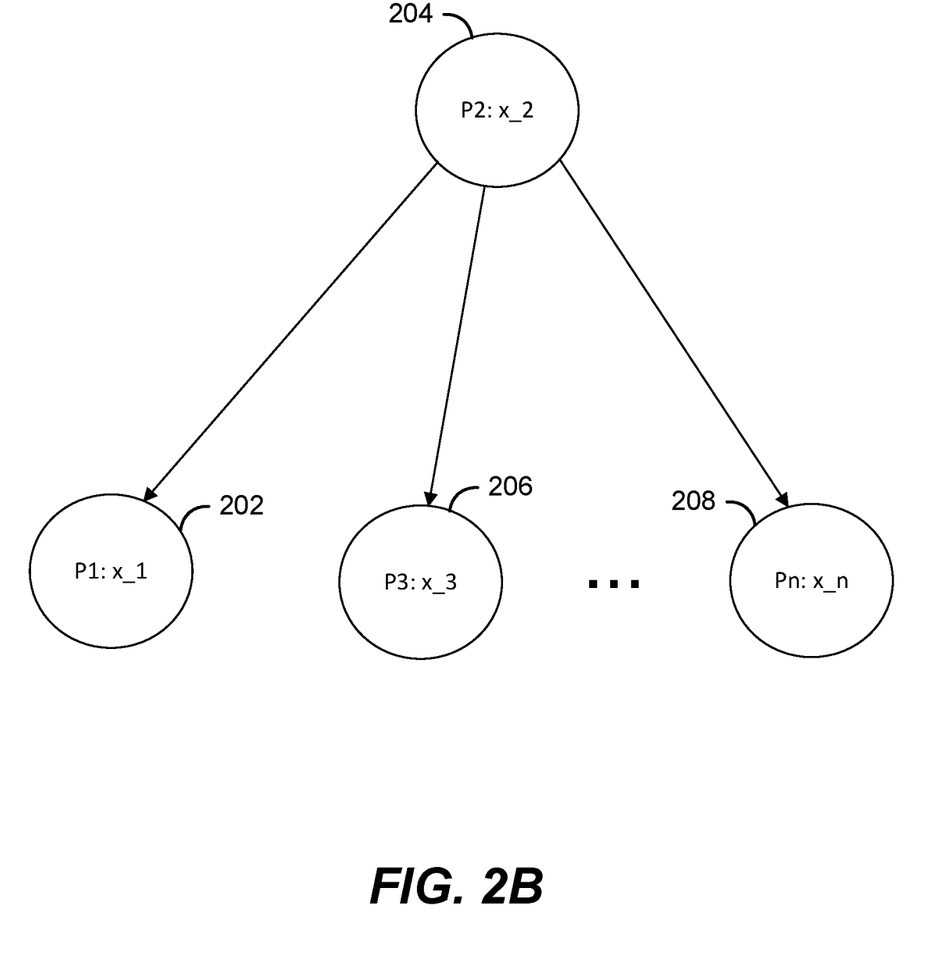
Figure 2C:
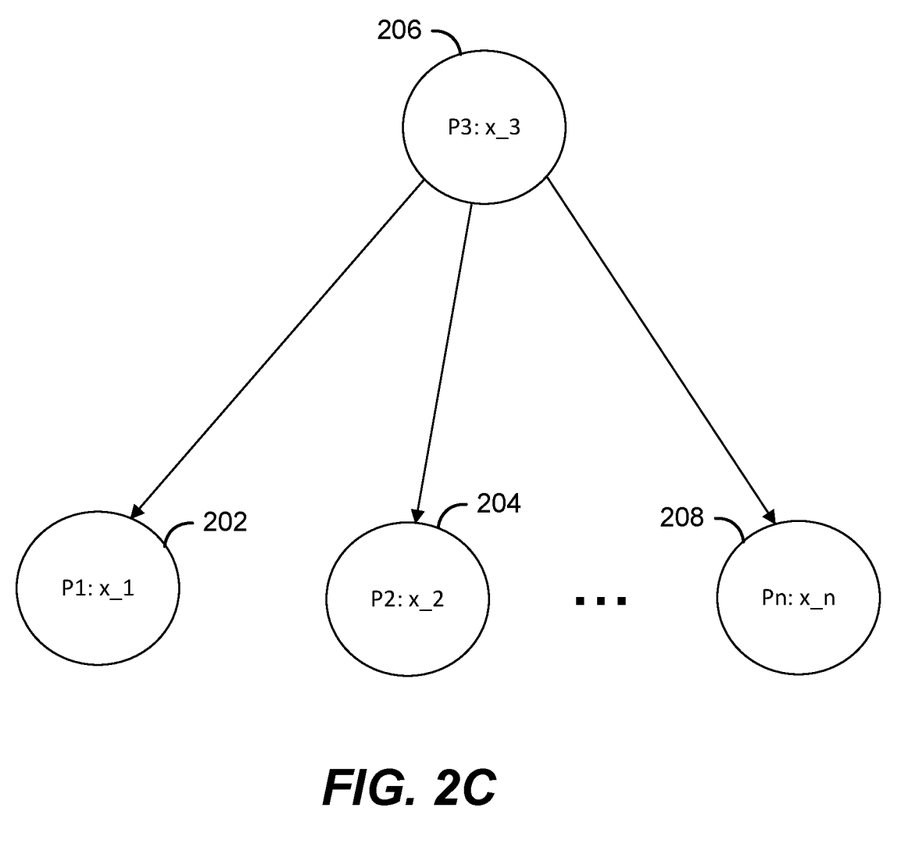

FIGS. 2A-2C illustrate one example of information is shared among parties in multi-party computation, in accordance with embodiments of the present disclosure. In some embodiments, each party 202, 204, 206, through 208 can secretly compute $x\_i*G'$ and then share the result publicly instead of $x\_i$ itself. Each party then receives every other party's $G'*x\_i$ and then adds them up to some invariant sum $G' *(x\_1+x\_2 \ldots x\_n)$. In some embodiments, because the sum is invariant, the child key shares can be refreshed regularly at predetermined intervals. In such embodiments, since $x\_i$ is never shared to the public and the child key shares are constantly being refreshed, this method of key share derivation essentially acts as a hardened derivation because even if different child private key shares become compromised overtime, the original root key shares cannot be reverse engineered. FIG. 2A shows party 202 sending $x\_1*G'$ to parties 204, 206, and 208. FIG. 2B shows party 204 sending $x\_2*G'$ to parties 202, 206, and 208. FIG. 2C shows party 206 sending $x\_3*G'$ to parties 202, 204, and 208.

Figure 3:
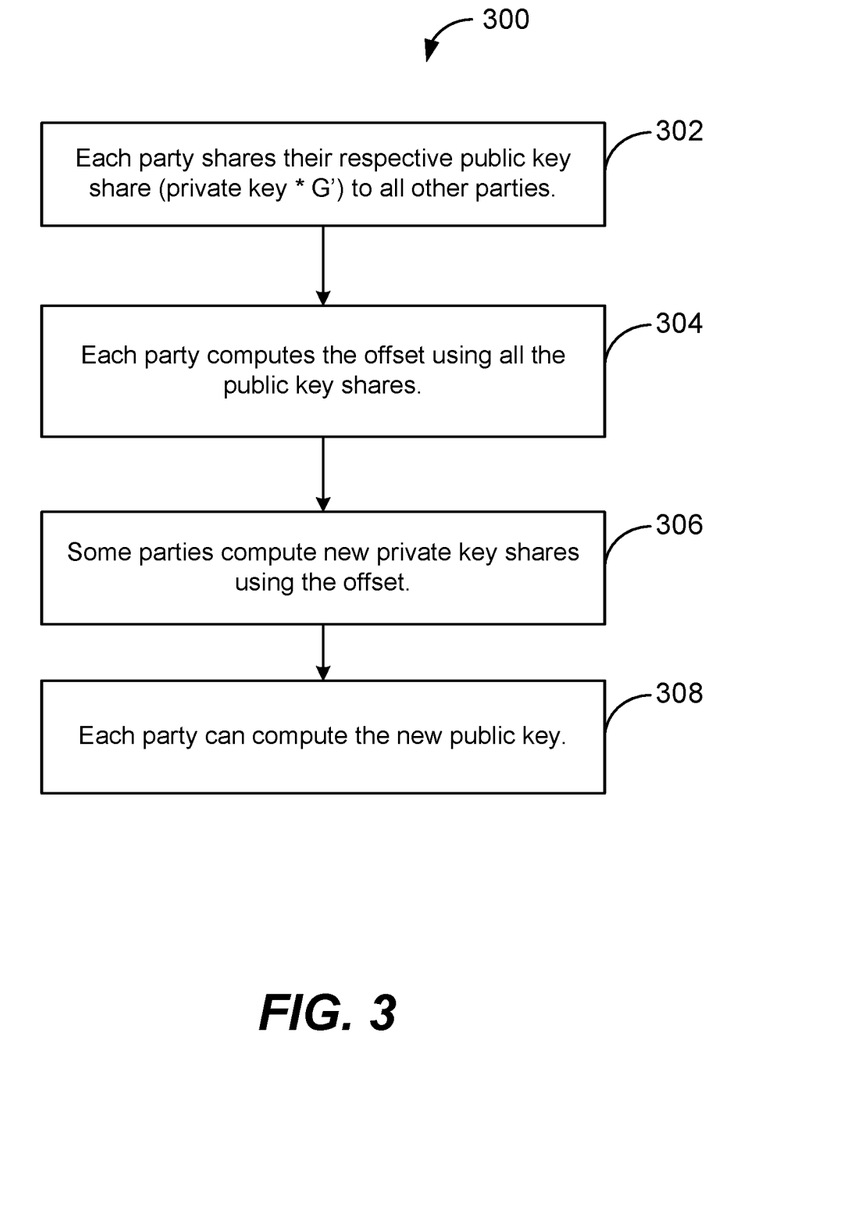
FIG. 3 illustrates a method for multiparty private key derivation, in accordance with embodiments of the present disclosure.

FIG. 3 illustrates a method for multiparty private key derivation, in accordance with embodiments of the present disclosure. At step 302, each party shares their respective public key share (private key*G') to all other parties. According to various embodiments, all parties that own private key shares are independent and do not know each other's private key share value. In some embodiments, the system implements identical versions of virtual agents on multiple different servers acting as parties 1, 2 . . . n. In some embodiments, the private key shares are computed but never revealed to anyone else. At 304, once each party receives all other parties' public key shares (private key*G'), each party computes the offset using all the public key shares. At 306, some parties compute new private key shares using the offset. In some embodiments, all parties compute the private key shares, but in other embodiments, only a select few needs to compute the private key shares (e.g., in cases where redundancy is present). Last, at 308, each party can compute the new public key once they receive the new public key shares (new private key*G).

Figure 4:
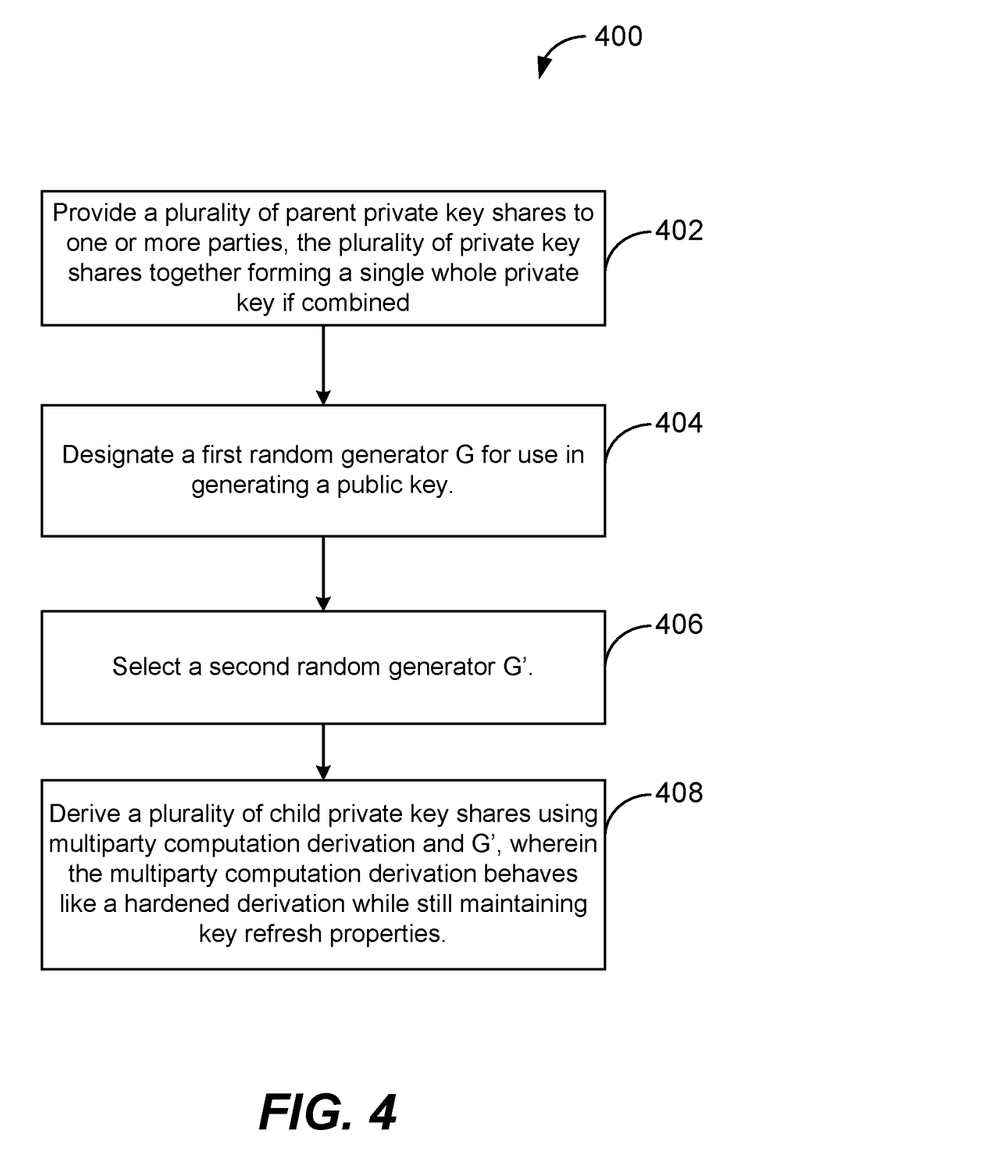
FIG. 4 illustrates a method for hardened derivation using multiparty computation, in accordance with embodiments of the present disclosure.

FIG. 4 illustrates a method 400 for hardened derivation using multiparty computation, in accordance with embodiments of the present disclosure. At 402, a plurality of parent private key shares is provided to one or more parties. In some embodiments, the plurality of private key shares together form a single whole private key if combined. At 404, a first random generator G is designated for generating a public key. In some embodiments, G is a random generator on an elliptic curve. At 406, a second random generator G' is selected. Last, at 408, a plurality of child private key shares are derived using multiparty computation derivation and G'. The multiparty computation derivation behaves like a hardened derivation while still maintaining key refresh properties.

In some embodiments, key refresh properties are maintained if the sum of the plurality of parent private key shares equals the sum of the plurality of child private key. In some embodiments, selecting G' includes selecting an elliptic curve generator with the following property: $G'(x\_1)*G'(x\_2) \ldots *G'(x\_n)=G'(y\_1)*G'(y\_2) \ldots *G'(y\_n)$ when $(x\_1+x\_2 \ldots +x\_n)=(y\_1+y\_2 \ldots +y\_n)$, where * is some operator, $x\_n$ is a parent private key share, and $y\_n$ is a child private key share. In some embodiments, a child private key share is derived by adding an offset to a parent private key share, the offset being defined by: offset=hash((sum of all parent private key shares)*G', path), where path is a scalar value for child key share derivation. In some embodiments, deriving the plurality of child private key shares includes each party of the one or more parties providing the product of their respective parent private key share and G' to all other parties in the one or more parties. In some embodiments, deriving the plurality of child private key shares includes each party of the one or more parties generating an offset. In some embodiments, each party can compute a new public key without ever receiving another party's child private key share.

In some embodiments, one trick is to find a function G' that has no relation to G. According to various embodiments, the techniques and mechanisms of the present disclosure present a framework of descendent key pair derivation in the multiparty computation context to ensure that it is computationally hard to recover the parent key pair given any descent key pair.

According to various embodiments, the techniques and mechanisms of the present disclosure can be implemented differently given a specific application context. As an example, one way to implement the algorithm is essentially having n parties implemented as n programs behaving as the n parties. Each program will start off with their own private key share, and then perform p2p communication to exchange information (e.g., M\_i values). In the end, each program will obtain the new private key shares as well as the corresponding public key.

The techniques and mechanisms of the present disclosure provide many benefits over current solutions. In some embodiments, the techniques and mechanisms of the present disclosure allow one to perform child key derivation in the MPC context, which means the solution will have the benefit of no single point vulnerability of MPC while having the convenience in hierarchical key management of descendent key derivation. In such embodiments, avoiding single point vulnerability means whenever one or more party is compromised, the full private key will not be leaked, leading to greater security guarantee.

In addition, the techniques and mechanisms of the present disclosure present a hierarchical key management. In such embodiments, agents can hold access to a single parent private key while simultaneously have access to all the descendent keys that it can be derived into, this makes key management a lot easier.

Figure 5:
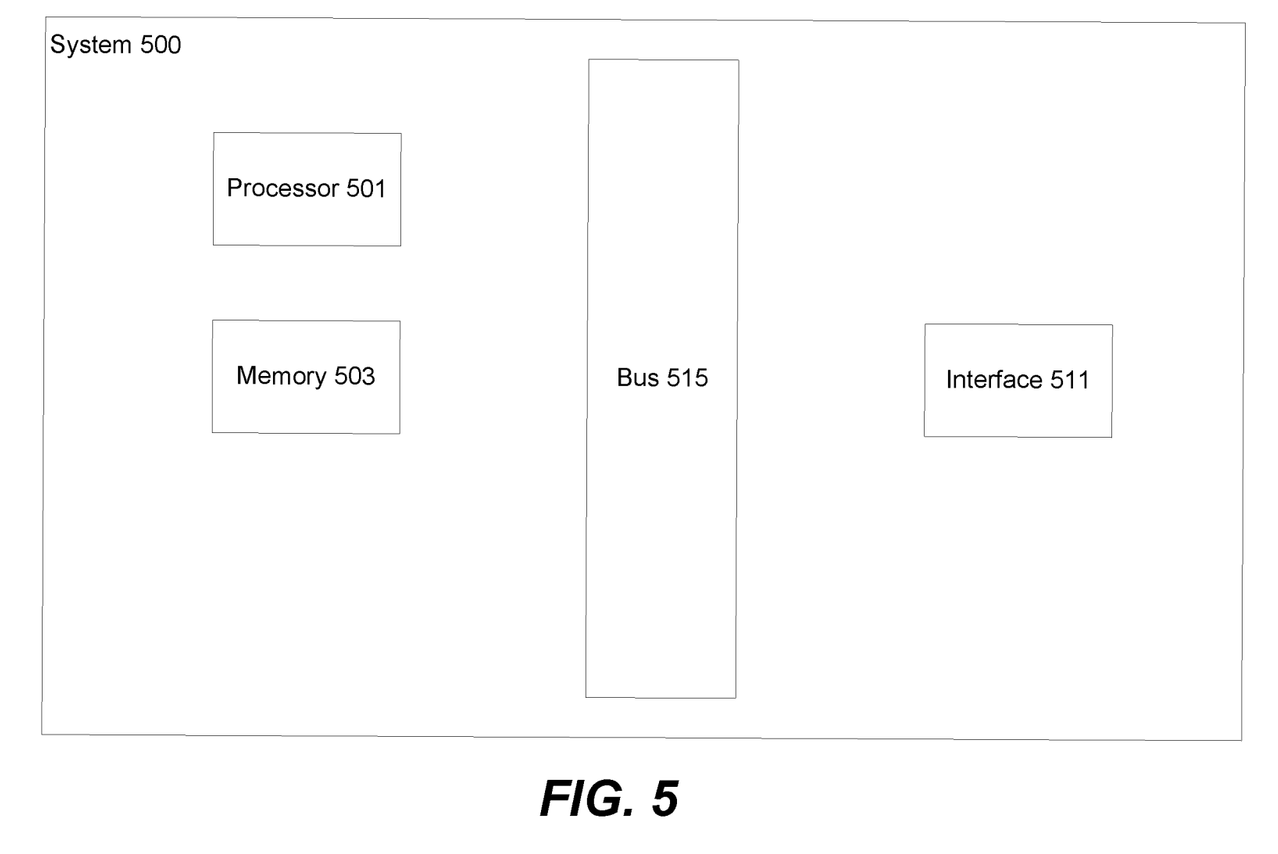
FIG. 5 illustrates an example of a computer system, configured in accordance with embodiments of the present disclosure.

The examples described above present various features that utilize a computer system. However, embodiments of the present disclosure can include all of, or various combinations of, each of the features described above. FIG. 5 illustrates one example of a computer system, in accordance with embodiments of the present disclosure. According to particular embodiments, a system 500 suitable for implementing particular embodiments of the present disclosure includes a processor 501, a memory 503, an interface 511, and a bus 515 (e.g., a PCI bus or other interconnection fabric). When acting under the control of appropriate software or firmware, the processor 501 is responsible for implementing applications such as an operating system kernel, a containerized storage driver, and one or more applications. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 500 is a computer system configured to perform computations, as shown herein. In some implementations, one or more of the computer components may be virtualized. For example, a physical server may be configured in a localized or cloud environment. The physical server may implement one or more virtual server environments. Although a particular computer system is described, it should be recognized that a variety of alternative configurations are possible. For example, the modules may be implemented on another device connected to the computer system.

In the foregoing specification, the present disclosure has been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure.

What is claimed is:

1. A method comprising:
    providing a plurality of digital parent private key shares to one or more parties, the plurality of private key shares together forming a single whole private key when combined;
    designating a first random generator G for generating a public key;
    selecting a second random generator G'; and
    deriving a plurality of digital child private key shares using multiparty computation derivation and G', wherein the multiparty computation derivation is a hardened derivation while still maintaining key refresh properties, wherein the key refresh properties are maintained when the sum of the plurality of digital parent private key shares equals the sum of the plurality of digital child private key shares, wherein selecting G' includes selecting an elliptic curve generator with the following property:
    $G'(x\_1)*G'(x\_2) \ldots *G'(x\_n)=G'(y\_1)*G'(y\_2) \ldots *G'(y\_n)$ whenever $(x\_1+x\_2 \ldots +x\_n)=(y\_1+y\_2 \ldots +y\_n)$, where * is an operator, x_n is an original private key share, and y_n is a refreshed private key share.

2. The method of claim 1, wherein a child private key share is derived by adding an offset to a parent private key share, the offset being defined by: offset=hash ((sum of all parent private key shares)*G', path), where path is a scalar value for child key share derivation.

3. The method of claim 1, wherein deriving the plurality of child private key shares includes each party of the one or more parties providing the product of their respective parent private key share and G' to all other parties in the one or more parties.

4. The method of claim 1, wherein deriving the plurality of child private key shares includes each party of the one or more parties generating an offset.

5. The method of claim 1, wherein each party includes the ability to compute a new public key without ever receiving another party's child private key share.

6. A system comprising:
    a processor; and memory, the memory storing instructions to execute a method, the method comprising:
    providing a plurality of digital parent private key shares to one or more parties, the plurality of private key shares together forming a single whole private key when combined;
    designating a first random generator G for generating a public key;
    selecting a second random generator G'; and
    deriving a plurality of digital child private key shares using multiparty computation derivation and G', wherein the multiparty computation derivation is a hardened derivation while still maintaining key refresh properties, wherein the key refresh properties are maintained when the sum of the plurality of digital parent private key shares equals the sum of the plurality of digital child private key shares, wherein selecting G' includes selecting an elliptic curve generator with the following property:
    $G'(x\_1)*G'(x\_2) \ldots *G'(x\_n)=G'(y\_1)*G'(y\_2) \ldots *G'(y\_n)$ whenever $(x\_1+x\_2 \ldots +x\_n)=(y\_1+y\_2 \ldots +y\_n)$, where * is an operator, x_n is an original private key share, and y_n is a refreshed private key share.

7. The system of claim 6, wherein a child private key share is derived by adding an offset to a parent private key share, the offset being defined by: offset=hash ((sum of all parent private key shares)*G', path), where path is a scalar value for child key share derivation.

8. The system of claim 6, wherein deriving the plurality of child private key shares includes each party of the one or more parties providing the product of their respective parent private key share and G' to all other parties in the one or more parties.

9. The system of claim 6, wherein deriving the plurality of child private key shares includes each party of the one or more parties generating an offset.

10. The system of claim 6, wherein each party includes the ability to compute a new public key without ever receiving another party's child private key share.

11. A non-transitory computer readable medium storing instructions for executing a method, the method comprising:
    providing a plurality of digital parent private key shares to one or more parties, the plurality of private key shares together forming a single whole private key when combined;
    designating a first random generator G for generating a public key;
    selecting a second random generator G'; and
    deriving a plurality of digital child private key shares using multiparty computation derivation and G', wherein the multiparty computation derivation is a hardened derivation while still maintaining key refresh properties, wherein the key refresh properties are maintained when the sum of the plurality of digital parent private key shares equals the sum of the plurality of digital child private key shares, wherein selecting G' includes selecting an elliptic curve generator with the following property:
    $G'(x\_1)*G'(x\_2) \ldots *G'(x\_n)=G'(y\_1)*G'(y\_2) \ldots *G'(y\_n)$ whenever $(x\_1+x\_2 \ldots +x\_n)=(y\_1+y\_2 \ldots +y\_n)$, where * is an operator, x_n is an original private key share, and y_n is a refreshed private key share.

12. The non-transitory computer readable medium of claim 11, wherein a child private key share is derived by adding an offset to a parent private key share, the offset being defined by: offset=hash((sum of all parent private key shares)*G', path), where path is a scalar value for child key share derivation.

13. The non-transitory computer readable medium of claim 11, wherein deriving the plurality of child private key shares includes each party of the one or more parties providing the product of their respective parent private key share and G' to all other parties in the one or more parties.

14. The non-transitory computer readable medium of claim 11, wherein deriving the plurality of child private key shares includes each party of the one or more parties generating an offset.

\* \* \* \* \*